Nov. 7, 1950     P. GLASS     2,529,290

ELECTRICAL CONTROL CIRCUIT

Filed July 18, 1944

INVENTOR.
Paul Glass
BY Ernest A. Wegner
his atty.

Patented Nov. 7, 1950

2,529,290

UNITED STATES PATENT OFFICE 2,529,290

ELECTRICAL CONTROL CIRCUIT

Paul Glass, Chicago, Ill., assignor to Askania Regulator Company, Chicago, Ill., a corporation of Illinois Application July 18, 1944, Serial No. 545,483

26 Claims. (Cl. 318—29)

1

The invention relates to electrical control circuits, particularly circuits employing electron discharge tubes, and has as a general object to provide a new and improved circuit of the character described adapted for the simultaneous control of a pair of devices.

Another object of the invention is to provide a new and improved electrical control circuit operable to govern the alternate energization of a pair of devices through the agency of a single means.

Another object is to provide a new and improved electrical control circuit operable to govern the alternate energization of a pair of devices through the agency of a single means responsive to an alternating current signal.

Yet another object is to provide an electrical control circuit operable to maintain one or the other of a pair of electrical devices energized during each cycle of an alternating current energy supply source, and having a single means responsive to the magnitude of a signal determining the proportion of time that each device is energized.

Still another object is to provide an electrical circuit, for the control of a pair of motors whose armatures are mounted on a common shaft, having a single signal receiving means and operable in accordance with the direction of departure of the signal magnitude from a given value to determine the direction of rotation of the common shaft and operable by the extent of departure from the given value in at least one direction to determine the speed of rotation of the shaft.

A further object is to provide an electrical circuit, for the control of a pair of motors whose armatures are mounted on a common shaft, having a single signal receiving means and operable in accordance with the direction of departure of signal magnitude from a given value to determine the direction of rotation of the common shaft and further operable with departure of the signal in one direction to cause rotation of the shaft at full speed independently of the extent of departure, and operable with departure in the other direction to cause rotation at a speed determined by the extent of departure.

Other objects and advantages will become apparent from the following detailed description taken in connection with the accompanying drawings, in which:

Fig. 2 is a vector type diagram illustrating the phase relationship of the various voltages of the

2 main or pilot tube, the condition represented being one in which no signal is impressed upon the circuit.

While the invention is susceptible of various modifications and alternative constructions, it is herein disclosed and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

Figure 1:
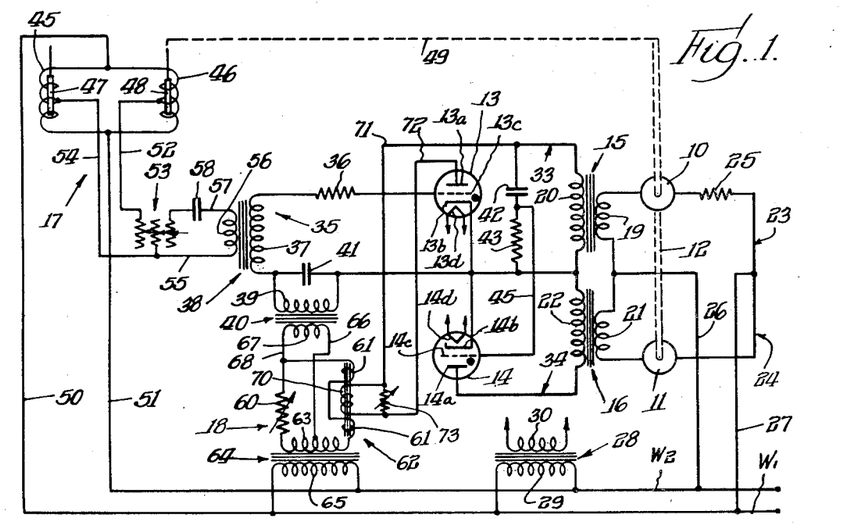
Fig. 1 is a diagrammatic representation of a circuit embodying the features of this invention.

In the exemplary embodiment of the invention shown in the drawings for purposes of disclosure, 10 and 11 represent electrical devices which are to be controlled. These devices may take a variety of forms and may be relays or the like for in turn controlling some other apparatus, they may be electron tubes, or they may, as here represented, be electric motors of the alternating current type, the armatures of which are mounted on a common shaft represented at 12. Associated with these devices is a control circuit comprising generally a pair of electron discharge tubes 13 and 14 of the gaseous discharge type having an alternating current anode voltage and acting through electrical coupling means 15 and 16 to govern energization of the devices 10 and 11. Control of the devices 10 and 11 by the circuit is such that one or the other of the devices is effectively energized during each half cycle of the alternating current anode voltage that the anodes are positive. Herein only the positive half cycles of the anode voltage are material and any reference hereinafter made to the operation of the tube is intended to apply to the positive half cycle only unless the contrary is specifically stated or is clearly indicated by the context. Thus "firing" or "non-firing" refers to the action when the anode is positive and not to the condition when the anode is negative when, of course, the tubes also cease to conduct. Actually, as will shortly be made known, each tube fires for a period somewhat longer than the positive half cycle of the sinusoidal, non-firing anode voltage.

The circuit is such that the tube 13 is the main or pilot tube, being controlled by a suitable signal impressed on the circuit and operable in turn to control the firing of the tube 14. Operation of the tube 14 is opposite to that of the tube 13, that is, when the tube 13 is firing the tube 14 is not firing, and when the tube 13 is not firing tube 14 is firing. The circuit is responsive to an alternating current signal and includes means operable to render the main or pilot tube 13 capable of firing continuously or incapable of firing for intervals of varying length. The circuit, moreover, may be adjusted to respond variously to an alternating current signal, more particularly, change in magnitude of such a signal. Thus the circuit may be so adjusted that departure of the signal from a given magnitude in one direction will cause the pilot tube 13 to fire continuously, while departure of the signal in the opposite direction will prevent firing of the pilot tube 13 and hence produce continuous firing of the tube 14. On the contrary, certain values of circuit elements may be so adjusted that departure of the signal from a predetermined value will not produce continuous firing of one or the other of the tubes but will merely control the proportionate time of firing of the tubes, and hence the time of energization of the devices, with the variation in proportionate time depending upon the extent of signal departure. The circuit is thus adaptable, as will later become more apparent, to vary the proportionate time of energization of the devices in accordance with the direction of departure of signal magnitude from a given value and thus in a motor control circuit, such as herein disclosed, becomes capable, in response to an alternating current signal, to determine the direction of rotation of the common shaft 12 and also the speed of rotation. This rotation may, depending upon the adjustments made, always be at full speed in one direction or the other, or may be, as hereinafter more fully described, full speed in one direction regardless of the extent of signal departure, and a speed in the other direction proportional to the extent of signal departure.

As here shown, the coupling means 15 and 16 are saturable reactors so that, upon firing of the tube 13, for example, the impedance of the reactor 15 is so varied as to bring about energization or lack of effective energization of the device 10, depending upon the circuit connections, while firing of the tube 14, likewise, so varies the impedance of the reactor 16 as to bring about energization or lack of effective energization of the device 11, again depending upon the circuit connections. The tube 14, it will be remembered, is under the control of tube 13, firing only when the tube 13 is not firing, while the tube 13 is under the control of alternating current signal means, generally designated 17, and means, generally designated 18, for determining the proportionate time of firing of the tubes for a signal of given magnitude.

Turning now to a more detailed consideration of the circuit, the reactor 15 comprises a first, primary or reactor winding 19 and a second, secondary or control winding 20 having a common magnetic core. Similarly, reactor 16 comprises a first, primary or reactor winding 21 and a second, secondary or control winding 22 having a common magnetic core. The reactor windings 19 and 21 each have a normal, relatively high impedance which is materially lowered upon the flow of unidirectional current through the corresponding secondary or control windings 20 and 22, respectively. It is this characteristic of reactors that is here employed to initiate or arrest effective energization of the devices 10 and 11. To that end, the reactor winding 19 is connected in electrical circuit with the device 10 and a source of alternating current in such manner that the variation in impedance of the reactor initiates or arrests effective energization of the device 10, even though the device is permanently in circuit with the source of alternating current. Likewise, reactor winding 21 is connected in circuit with the device 11 and the source of alternating current. Herein the reactor windings 19 and 21 are each connected in series circuit, respectively, with the devices 10 and 11, though it is conceivable that under some circumstances a parallel connection would be feasible and desirable. Each circuit may, for convenience, be referred to as a reactor-device circuit and will hereinafter be designated by the reference characters 23 and 24. Reactor-device circuit 23 includes in series the winding 19, the device 10 and a resistance 25, while reactor-device circuit 24 includes merely the winding 21 and the device 11. Both circuits are by common leads 26 and 27 connected to a source of alternating current represented by line wires W1 and W2. The devices 10 and 11 herein being shown as motors, they are connected in circuit to tend to rotate shaft 12 in opposite directions.

The tubes 13 and 14 are of the gaseous discharge type and thus are operable, once broken down, to continue to fire during the time that the plate voltage remains positive. Tube 13 comprises at least an anode or plate 13a, a cathode 13b and a control grid 13c. Similarly tube 14 comprises an anode or plate 14a, a cathode 14b and a control grid 14c. The cathodes are herein shown indirectly heated through filaments 13d and 14d, respectively, energized through a heater transformer, generally designated 28, whose primary winding 29 is connected to the line wires W1 and W2 and whose secondary winding 30 is connected to the filaments 13d and 14d. The plate voltage for the tube 13 is supplied by the winding 20, while the plate voltage for the tube 14 is supplied by the winding 22, the reactors 15 and 16 serving the dual purpose of reactors and transformers. To that end, the tube 13 has a plate circuit, generally designated 33, which includes the winding 20, and the tube 14 has a plate circuit, generally designated 34, which includes the winding 22.

The tube 13 being the one under direct control by the signal has a grid circuit, generally designated 35, which includes a resistance 36, the secondary winding 37 of a signal input transformer 38, and the secondary 39 of a grid bias transformer 40, the latter having in parallel therewith a capacitor 41. Inasmuch as the tube 14 is under the control of the tube 13, its grid 14c derives its potential from means influenced by the tube 13. To that end, there is connected in series across the plate circuit 33, that is, in parallel with the winding 20, a capacitor 42 and a resistor 43. The capacitor and resistor are so connected in circuit that one terminal of the capacitor is connected to the plate and one terminal of the resistor is connected to the cathodes of the tubes. The common terminal of the capacitor and resistor is by a lead 45 connected to the grid 14c of the tube 14. The capacitor 42 and the resistor 43 are so chosen that the reactance of the capacitor 42 is small compared to the resistance of the resistor 43, the values being in the order of one to ten.

The manner in which the tube 13 with the circuit thus far described controls theh firing of the tube 14 is fully disclosed and claimed in the Paul Glass and Frank E. Prem, Letters Patent No. 2,517,783, dated August 8, 1950. Inasmuch as the circuit arrangement whereby tube 13 controls the firing of tube 14 is not herein claimed per se, the manner in which this portion of the circuit functions will be briefly described, the above mentioned application being relied upon for a more complete statement of operation. Suffice it to say, therefore, that when the tube 13 is not firing the voltage of the secondary 20 of the reactor 15 and hence also the plate voltage of the tube 13 is a sine wave substantially in phase opposition to the applied line voltage. Similarly, when the tube 14 is not firing, the voltage of the secondary winding 22 of the reactor 16, and hence the plate voltage of the tube 14, is a sine wave substantially in phase opposition to the applied line voltage. This sine wave voltage may thus be referred to as the non-firing plate voltage. When the tube 13 is not firing, the full voltage of the secondary winding 20 appears across the series connected capacitor 42 and resistor 43, and, inasmuch as the value of the resistor 43 is large compared to the reactance value of the capacitor 42, almost the full voltage of the secondary winding 20 appears across the resistor 43 and constitutes the grid potential of the tube 14. Inasmuch as the non-firing voltages of the windings 20 and 22 are the same and, particularly, of the same phase, it will readily be seen that the potential of the grid 14c derived from the potential of the resistor 43 will be of substantially the same phase as the plate voltage, with the result that the tube 14 breaks down and fires at the beginning of every positive half cycle. The manner in which tube 14 is caused to fire whenever the tube 13 is not firing is thus readily apparent.

Just as tube 14 is caused to fire when tube 13 is not firing, so also tube 14 is prevented from firing when tube 13 is firing, though the manner in which this is accomplished is somewhat more complicated. As more fully pointed out in the above referred to copending application, when the tube 13 is firing, the plate voltage no longer has a sinusoidal form, but has a substantially constant and low value, while the tube is conducting, with this constant value preceded by a small, positive peak and followed by a negative, approximately sinusoidal portion during the time that the tube is not conducting. The tube commences to fire slightly in advance of the time that the non-firing voltage of the winding 20 becomes positive and continues to fire for a substantial time after the non-firing voltage has become negative. The small positive voltage peak above mentioned produces a sharp current peak through the capacitor 42 and the grid cathode path of the tube 14, resulting in the capacitor 42 being charged so that the common terminal connected to the lead 45 is negative. Following this brief charging period, the condenser discharges through the now broken-down tube 13 and resistor 43. The time constant of this discharge path is large and hence the discharge period continues until the tube 13 stops firing and thus throughout this time the potential of the grid 14c will be negative. Thus the potential of the grid 14c is maintained negative throughout the entire half cycle that the plate 14a of the tube 14 is positive, and thus firing of the tube while the tube 13 is firing has been prevented. It is immaterial whether the grid 14c becomes positive for a very brief instant as the firing plate voltage of the tube 13 reaches the small positive peak above mentioned, because this occurs and the grid 14c again becomes negative prior to the time that the plate voltage of the tube 14 becomes positive due to the fact that the tube 13 breaks down in advance of the time when the non-firing plate voltage becomes positive. To assure this prevention of firing of the tube 14 at a transition state, as well as at a state when the circuit has reached steady operation, the resistance 25 is incorporated in the reactor-device circuit 23. This resistance 25 serves to advance slightly the non-firing plate voltage of the tube 13 relative to the non-firing plate voltage of the tube 14, and may be accomplished by the employment of a variety of other means appropriately connected to the circuits for either the tube 13 and its associated device 10 or the tube 14 and its associated device 11.

Having described the control of tube 14 by tube 13, control of the primary tube 13 will now be described. As already stated, the tube 13 is under the control of alternating current signal generating means 17 and means 18 cooperating with the signal means 17 for determining the proportionate time of firing of the tubes for a signal of given magnitude. The signal generating means 17 needs to be capable of generating signals of varying voltage magnitude but not of different character. Herein, the means 17 takes the form of an inductance bridge composed of coils 45 and 46 each having a relatively movable iron core 47 and 48, respectively. The cores 47 and 48 are variously actuated to produce the desired signal depending upon the purpose to which the circuit is put. When used for control purposes for which this circuit is particularly adapted, one of the cores may be actuated by a demand or condition to be met or controlled, while the other may be actuated by the common shaft 12 progressively to offset the effect of the first mentioned core as the new adjustment is approached. Some suitable connection between the shaft 12 and the core 48 is diagrammatically represented by the broken line 49. The coils 45 and 46 are energized directly from the line wires W1 and W2 and, to that end, are in well known manner connected to the line wires by leads 50 and 51 connected to the terminals of the coils 45 and 46. A center tap of the coil 46 is by a lead 52 connected to one terminal of a T-pad attenuator 53, while a center tap of the coil 45 is by a lead 54 connected to a second terminal of the attenuator 53. This last named terminal of the attenuator is by a lead 55 connected to one end of a winding 56 which is the primary of the signal input transformer 38. The remaining end of the winding 56 is by a lead 57 connected to the third and remaining terminal of the attenuator 53.

To give the signal voltage the proper phase relationship with respect to the line voltage, so that it may be effective to control the tube 13, a condenser 58 is interposed in the lead 57 so as to be connected in series with the attenuator 53 and the winding 56. Moreover, the values of the condenser and the winding 56 are chosen to give resonance at the frequency of the signal source and at a signal of predetermined magnitude chosen as the base signal, as will later be more fully pointed out. The transformer 38 has an iron core and, if the circuit elements are properly chosen, the voltage measured across the secondary of the input transformer and resulting from the selected base signal will be substantially 90° out of phase with the line voltage.

An alternating current grid bias is provided which is substantially 180° out of phase with the plate voltage. Such grid bias is here provided by the means 18 which includes a phase shifter means. The means 18 comprises a variable resistance 60, divided coils 61 forming the secondary winding of a saturable reactor, generally designated 62, and a winding 63 connected in series. The winding 63 is the secondary winding of a transformer 64 having a primary winding 65 connected across the line wires W1 and W2. To avoid direct connection of the bias phase shifter means with the grid circuit, the means 18 is inductively coupled through the grid bias transformer 40. To that end, the midpoint of the winding 63 is by a lead 66 connected to one end of a winding 67 forming the primary of the grid bias transformer 40. The other end of the winding 67 is by a lead 68 connected to the phase shifter circuit intermediate the resistance 60 and the coils 61. With the arrangement just described, the grid bias voltage can be adjusted to have a phase angle lagging the line voltage from 0° up to 180° by varying the resistance 60 between its maximum value and zero. Throughout such variation in phase angle, the magnitude of the voltage remains substantially the same, being equal to one-half the voltage across the winding 63. It will be appreciated, of course, that the phase angle may also be varied by adjustment of the saturable reactor 62 and this is precisely what is done herein, as will presently be more fully pointed out.

The saturable reactor 62 has a primary winding 70 which is by leads 71 and 72 connected in series in the plate circuit of the tube 13. As is customary and conventional, and as indicated by the showing of a pair of windings 61 on opposite sides of the primary winding 70 and wound in opposite directions around the core, the fluxes produced by windings 61 induce no alternating current voltage in the primary winding 70. Connected in parallel with the winding 70 is a variable resistance 73.

It is a known characteristic of tubes of the gaseous discharge type that, once broken down, they will continue to fire during the remaining portion of the half cycle that the plate is positive. Each tube, moreover, depending upon the characteristics of the particular tube, has a critical grid voltage which, when reached or exceeded while the plate is positive, results in break-down of the tube. This critical voltage is usually relatively low hence a grid voltage leading the plate voltage by almost 180° results in break-down of the tube throughout substantially the full half cycle that the plate is positive. It is known that this will occur even though the grid voltage is gradually retarded with respect to the plate voltage until it is in phase therewith. Even though the grid voltage may be displaced so much in phase as to lag the plate voltage, it will still result in break-down of the tube though for a period less than the substantially half cycle that the plate is positive. As the grid voltage lags the plate voltage by successively greater angles, the period of firing of the tube becomes progressively shorter until a point is reached where no break-down of the tube not even for a short interval occurs. This point is something less than a 180° lag of the grid voltage relative to the plate voltage and usually is short of a full 180° by the same amount that the leading grid voltage capable of causing break-down of the tube is short of 180°.

For convenience and more ready understanding, diagrams of the vector type shown in Figs. 2 to 7 will be employed in the subsequent disclosure and explanation of operation of the invention. In such figures LVV represents the line voltage vector, PVV represents the firing plate voltage vector, GBVV represents the grid bias voltage vector, and GVV represents the grid voltage vector, this being the resultant of the grid bias voltage and the signal voltage. The sector A is that range of leading phase relationship above described into which the grid voltage vector must fall if the tube is to break-down for substantially the entire half cycle that the plate is positive. This range extends, as above stated, from a leading phase angle of something less than the 180° to in-phase relationship. The sector B represents that range of lagging phase relationship which results in break-down of the tube for progressively smaller periods as the phase angle increases. This decrease in length of break-down is intended to be represented by the wedge-shape of the sector B, and this sector, like the sector A, is something less than 180°, conventionally being less by the same amount that the sector A is less than 180°. The sector C is the dead zone of the tube, that is, the sector in which no firing of the tube will occur if the grid voltage vector or the grid bias voltage vector lie within it. In these vector diagrams, clockwise rotation is considered as retardation, while counter-clockwise rotation is considered as advance of a vector with respect to the line voltage.

As above stated, and as more fully explained in the Glass and Prem application, Serial No. 650,042, filed February 25, 1946, now Patent No. 2,517,783, issued August 8, 1950, the plate voltage of the tubes upon firing advances slightly with respect to the non-firing plate voltage due to the peculiarities of circuits including reactors, such as 15 and 16 herein. This advance in the firing plate voltage is a peculiarity of the circuit disclosed and is not to be considered as an essential of this invention. This advance in the firing plate voltage is automatically offset or overcome by the employment of the saturable reactor 62 having its primary 70 in the plate circuit of the tube 13. Where the advance in the firing plate voltage is just offset the circuit, as will be more fully described hereinafter, is a simple on-and-off circuit with tube 13 firing so long as a signal of certain magnitude or greater is present and ceasing to fire entirely when the signal drops below that certain magnitude. This same construction, however, may be and is herein further utilized to more than offset the advance in the firing plate voltage and, as a consequence, in this circuit to permit the obtaining of control over the speed of operation of the common shaft 12, as well as the direction. The basic operation of the saturable reactor forming a part of the bias phase shifting means to determine the frequency of firing of a tube is fully set forth in the Glass and Prem application, Serial No. 522,048, filed February 12, 1944, now Patent No. 2,519,562, issued August 28, 1950. The general operation will therefore herein be set forth very briefly, reliance being had upon the above mentioned Glass and Prem application Serial No. 522,048 for the basic disclosure. Only those adaptations will be described whereby control of the direction of rotation of the shaft 12 at full speed in either direction, or direction control and speed control in at least one direction are obtainable by a variation in the magnitude of an alternating current signal.

Figure 2:
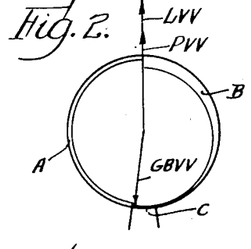
Figure 3:
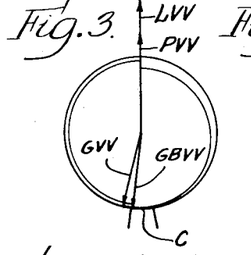
Fig. 3 is a view of the type of Fig. 2 showing the condition when a signal has been applied to the circuit but before firing of the tube has commenced.
Figure 4:
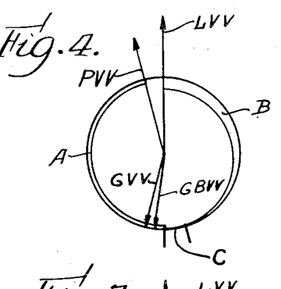
Fig. 4 is a view of the type of Fig. 2 showing the condition after firing of the tube and with the signal still present.

Fig. 2 illustrates the positions of the various voltage vectors when no signal is being received and with the grid bias voltage vector adjusted through the medium of the bias phase shifter means 18 to lie in the dead zone C just outside of the sector A. If now a small signal is applied to the circuit, it will retard the grid voltage vector GVV into the sector A, as shown in Fig. 3, resulting in the break-down of the tube 13 during substantially the entire positive half cycle of the plate voltage. Due to the fact that the plate voltage advances upon firing of the tube and carries with it all of the sectors A, B and C, not only the grid voltage vector GVV, but also the grid bias voltage vector GBVV lie within the sector A (see Fig. 4). If this condition were permitted to continue, it would mean that the tube 13 would fire continuously and would do so even after the signal were removed. While this might be desirable for certain purposes, it is not desirable for control purposes and hence the saturable reactor, connected as above described, is provided and may be adjusted to compensate or offset this advance in firing plate voltage or to over compensate to obtain the direction and speed control above mentioned.

With firing of the tube 13, current flows through the primary 70 of the saturable reactor 62, thereby reducing the effective inductance of the coil 61 and hence causing the phase shifter means 18 to advance the phase of the grid bias voltage. By adjustment of the resistance 73 the extent of advance of the grid bias voltage may be controlled so that it may just compensate for the advance in firing plate voltage, or it may be adjusted to over compensate. Under the condition in which the resistance 73 is adjusted so that the extent of advance of the grid bias voltage just compensates for the advance in firing plate voltage, the result is the same as if there had been no advance in firing plate voltage. In other words, instead of the vectors and the sectors A, B, C having the relative positions shown in Fig. 4, the grid voltage vector GVB and the grid bias voltage vector GBVV would also be advanced the same amount that the firing plate voltage vector and the sectors A, B, C were advanced. This would result in the grid bias voltage rector assuming the same position relative to the sector A which it had in Fig. 3, which illustrates the condition just prior to commencement of firing of the tube. In other words, the grid bias voltage vector would be restored to the sector C so that removal of the signal or, under proper conditions, reduction of the magnitude thereof below a certain value would arrest firing of the tube 13. The critical signal magnitude could be small or large, as desired, and could be determined by initial adjustment of the phase of the grid bias voltage. It is believed apparent that with the grid bias voltage so adjusted in phase that its vector GBVV lies just in advance of the sector A, as shown in Fig. 2, the critical signal voltage magnitude would, of course, be small. It is believed equally apparent, however, that the grid bias voltage might be so adjusted in phase that the grid bias voltage vector would fall at the opposite side of the sector C from that shown in Fig. 2, in which event the critical signal voltage magnitude would be large. Whatever the critical signal voltage magnitude chosen may be, it will be apparent from the foregoing that with the phase shifter means 18 adjusted just to compensate for the advance in the firing plate voltage of the tube 13, firing of the tube 13 will be under the control of the signal and dependent upon its relationship to the critical signal voltage magnitude. If the signal magnitude is greater than the critical magnitude, the tube 13 will fire continuously and hence, in this circuit, the motor 10 will be energized continuously and thus drive the shaft 12 at full speed in one direction. If the signal magnitude drops below the critical magnitude, the tube 13 will cease firing and will not fire again until the signal magnitude exceeds the critical magnitude. As a consequence, the tube 14 will fire continuously and thus the motor 11 will drive the shaft 12 at full speed in the opposite direction.

Figure 5:
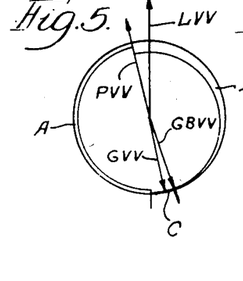
Fig. 5 is a view of the type of Fig. 2 showing the grid bias voltage advanced through a greater angle than the plate voltage.
Figure 6:
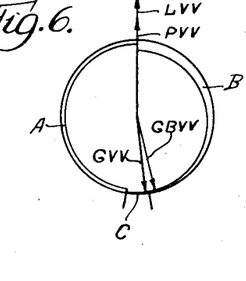
Fig. 6 is a view of the type of Fig. 2 showing the condition wherein the main or pilot tube has stopped firing, but the grid bias has not yet returned to its normal position of Fig. 2
Figure 7:
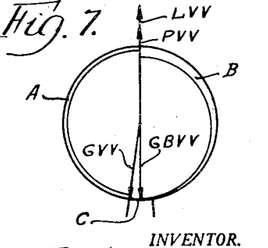
Fig. 7 is a view of the type of Fig. 2 with the tube again ready to recommence firing.

When the resistance 73 is adjusted so that the extent of advance of the grid bias voltage over compensates for the advance in the firing plate voltage, a condition is obtained where not merely the direction of rotation of the shaft 12 is controlled but where its speed of rotation in at least one direction is controlled by the magnitude of the signal voltage. This condition will hereinafter be described and, in connection therewith, it is pointed out that not only may the resistance 73 be adjusted to determine the extent of advance of the grid bias voltage but also that the time constant of the circuit including the primary 70 of the saturable reactor may be adjusted so as to result in a minimum on or firing time of the tube 13 and a maximum off or non-firing time for a given signal. The minimum on or firing time is, of course, one positive half cycle. Variations of the proportion of on and off-time may, of course, be obtained by this adjustment of the time constant of the circuit and of the value of the resistance 73 which has a certain critical value where minimum on-time is desired. Thus the adjustment might be such that the grid bias voltage vector is advanced, for example, to approximately the dividing line between the sectors C and B, as shown in Fig. 5. Such change in phase of the grid bias voltage, of course, also means a corresponding change in the grid voltage so that the grid voltage vector, as clearly seen from Fig. 5, now falls within the dead zone or sector C. Firing of the tube 13 would thus cease and, with such cessation of firing, the plate voltage would return to its normal or non-firing position leaving the various voltage vectors in the position shown in Fig. 6. Depending upon the time constant of the circuit including the primary of the saturable reactor, the grid and grid bias voltage vectors would eventually swing back to the position shown in Fig. 7, wherein the grid voltage vector again just enters the sector A, thereby resulting in firing of the tube 13 with the heretofore described steps repeated.

Where the time constant of a circuit is so adjusted that a minimum on-time and a maximum off-time for a given signal is obtained, that is, firing of the tube for the positive half of one cycle only, the length of the off-time will be dependent upon the magnitude of the signal voltage. This is readily understood from Figs. 5, 6 and 7. With the grid bias voltage vector always advanced to the position shown in Fig. 5 upon commencement of firing of the tube 13, the angle through which the grid voltage vector will have to swing to again fall within the sector A will vary with the magnitude of the signal. With a small signal, the grid voltage vector will lie closely adjacent the grid bias voltage vector, as shown in Fig. 5, for example, and will have to swing from its position in Fig. 6 to its position in Fig. 7 before the tube will again commence to fire. For progressively larger signals, the angle between the grid voltage vector and the grid bias voltage vector will, of course, increase with the off-time thus progressively shorter until a signal of such magnitude is reached that the grid voltage vector GVV would, in Fig. 5, remain in the sector A, at which time the tube 13 would, of course, fire continuously so long as the signal of that magnitude was impressed upon the circuit.

It has been found that it is readily possible, with the circuit adjusted to result in the minimum on-time of the tube 13 and the maximum off-time for a given signal, to obtain operation wherein the tube fires only once in twelve cycles of the line voltage. This, coupled with the arrangement whereby the tube 13 controls firing of the tube 14, makes possible control of the direction of rotation of the common shaft 12 and also makes possible control of the speed of rotation in at least one direction by the magnitude of an alternating current signal. More particularly, as above stated generally, direction of departure in magnitude of an alternating current signal from a base or predetermined signal, with the circuit adjusted as just described, results in selection of direction of operation of the common shaft 12, while the extent of signal magnitude departure in one direction determines the speed of rotation of the shaft 12 and departure in the opposite direction results in full speed independently of the extent of departure. Accordingly, there is selected herein as the basic or predetermined signal one having such magnitude that the tube 13 will fire or be on for one cycle and will be off for one cycle. In other words, the basic signal will be so chosen that the tube 13 will fire during alternate cycles. Inasmuch as the circuit is such that the tube 14 fires whenever the tube 13 is not firing, it follows that for this basic signal tube 14 also will fire during alternate cycles, more particularly, will fire during the cycles that the tube 13 is not firing. Thus the devices, herein the motors 10 and 11, will be energized equal amounts and will thus offset the effect of each other and the shaft 12 will remain stationary. Should the signal magnitude rise above the base or predetermined signal magnitude, the grid voltage vector will always remain in the sector A and hence the tube 13 will fire continuously. With the tube 13 firing continuously, tube 14 will not fire at all and hence the motor 10 will receive energy during each cycle and there will be no opposition by the motor 11 so that the motor 10 will drive the shaft 12 at full speed in a direction determined by the manner of connection of the motor in the circuit. It will be noted that it is immaterial how much the signal departs from the basic signal in this direction, for any departure results in full speed of the motor 10.

Should the signal magnitude, instead of rising above the base signal, fall below, the shaft 12 will be rotated in the opposite direction and will, moreover, be rotated at a speed dependent upon the extent of departure in the signal magnitude from the base signal. This will readily be appreciated from the foregoing, particularly from a consideration of Figs. 5, 6 and 7. With the signal magnitude only slightly less than the basic signal, the grid voltage vector in Fig. 5 will lie closely adjacent the sector A so that, for example, only two cycles will be required before the voltage vector again enters the sector A, as in Fig. 7. Under these conditions, the tube 13 will fire only once in every three cycles, while the tube 14 will fire twice in every three cycles. As a consequence, motor 11 will receive twice as much energy as motor 10 and hence will predominate and cause rotation of the shaft 12 in a direction reversely of that obtained upon energization of the motor 10 alone. The speed of rotation of the shaft will be about one-half full speed of the motor 11. With progressively smaller signals, that is, increasing departure of the signal from the basic signal, the off-times of the tube 13 will increase and hence the on-time of the tube 14 will correspondingly increase until the minimum permissible signal is reached, which signal would, for example, result in firing of the tube 13 only once out of every twelve cycles. This would mean that the tube 14 would fire eleven out of every twelve cycles and thus would operate at substantially full speed.

It is believed apparent from the foregoing that I have perfected a unique electrical control circuit whereby an alternating current signal is utilized to govern the proportionate time of operation of a pair of electrical devices, one or the other of which is to be energized at all times. This circuit, moreover, by mere change in the value of certain elements and without change or rearrangement of the elements is capable of operating in at least two distinct ways. With one adjustment, one or the other of the electrical devices is continuously and uninterruptedly energized so long as the alternating current signal has departed to one side or the other of a predetermined and critical signal magnitude, regardless of the extent of departure. With another adjustment of the value of the elements, departure of the signal magnitude from the critical or predetermined signal magnitude determines the proportionate time of energization of the electrical devices, with the proportionate time of energization upon departure of the signal magnitude in one direction varying with the extent of signal departure. In employment of the circuit for the control of a pair of motors connected to drive a common shaft, as herein shown, this means that the circuit may be employed merely to control the direction of rotation of the shaft with the shaft always being driven at full speed regardless of the extent of signal departure from the predetermined signal, or the direction of rotation of the shaft may be controlled by the direction of signal departure from the predetermined signal magnitude with the speed of rotation varying in proportion to the extent of departure in at least one direction of departure from the predetermined signal magnitude.

I claim as my invention:

1. A circuit for controlling the operation of a pair of electrical devices, one or the other of which is to be energized at all times, comprising a pair of electronic tubes each of the gaseous discharge type and having at least an anode, a cathode and a grid, each of said tubes being electrically associated with one of the pair of electrical devices to cause energization of the respective device upon firing of the tube associated therewith, an alternating current anode voltage for said tubes, means responsive to an alternating current signal for controlling the firing of one only of said tubes, and means solely under the control of said one of said tubes for controlling the firing of the other of said tubes.

2. A circuit for controlling the operation of a pair of electrical devices, one or the other of which is to be energized at all times, comprising a pair of electronic tubes each of the gaseous discharge type and having at least an anode, a cathode and a grid, each of said tubes being electrically associated with one of the pair of electrical devices to cause energization of the respective device upon firing of the tube associated therewith, means providing an alternating current voltage for the anodes of said tubes, means responsive to an alternating current signal controlling the firing of one of said tubes and operable when said signal is of a predetermined magnitude to cause said one of said tubes alternately to fire and not to fire for equal periods and to vary the ratio of firing to non-firing time of said one tube with departure of said signal from the predetermined magnitude, and means under the control of said one of said tubes for controlling the other of said tubes to fire whenever said one tube is not firing and to cease firing upon firing of said one tube.

3. A circuit for controlling the operation of a pair of electrical devices, one or the other of which is to be energized at all times, comprising a pair of electronic tubes each of the gaseous discharge type and having at least an anode, a cathode and a grid, each of said tubes being electrically associated with one of the pair of electrical devices to cause energization of the respective device upon firing of the tube associated therewith, means providing an alternating current voltage for the anodes of said tubes, means responsive to an alternating current signal controlling the firing of one of said tubes and operable when said signal is of a predetermined magnitude to cause firing of said one of said tubes during alternate cycles of the anode voltage and to vary the ratio of firing to non-firing time of said one tube with departure of said signal magnitude from the predetermined signal, and means under the control of said one of said tubes for controlling the other of said tubes to fire whenever said one tube is not firing and to cease firing upon firing of said one tube.

4. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, and means operable in response to an alternating current signal and to firing of said pilot tube governing operation of said pilot tube, said last named means being operable in response to the magnitude of the alternating current signal to determine the proportion of firing to non-firing time of said pilot tube.

5. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, and means responsive to an alternating current signal controlling the firing of said pilot tube, said last mentioned means being operable in response to an alternating current signal of a predetermined magnitude to have firing and non-firing times of equal intervals and operable with a departure in signal magnitude from the predetermined magnitude to vary the ratio of firing to non-firing time, with variation in ratio in at least one direction of signal departure being proportional to the extent of departure.

6. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, and means responsive to an alternating current signal controlling the firing of said pilot tube, said last mentioned means being operable in response to an alternating current signal of a predetermined magnitude to have firing and non-firing times of equal intervals and operable with an increase in signal magnitude to cause said pilot tube to fire continuously and operable with a decrease in signal magnitude to increase the ratio of non-firing to firing time in proportion to the extent of signal departure from the predetermined magnitude.

7. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, and means responsive to an alternating current signal controlling the firing of said pilot tube, said last mentioned means being operable in response to an alternating current signal of a predetermined magnitude to have said pilot tube fire during alternate cycles of the anode voltage and operable with an increase in signal magnitude to cause said pilot tube to fire continuously and operable with a decrease in signal magnitude to increase the number of cycles of non-firing of said pilot tube in proportion to the extent of signal departure from the predetermined magnitude.

8. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, and means responsive to an alternating current signal and to firing of said pilot tube controlling the firing of said pilot tube, said last mentioned means being operable with an alternating current signal of a predetermined magnitude present to have firing and non-firing times for said pilot tube of equal intervals and operable with an increase in signal magnitude to cause said pilot tube to fire continuously and operable with a decrease in signal magnitude to increase the ratio of non-firing to firing time in proportion to the extent of signal departure from the predetermined magnitude.

9. A circuit for controlling the operation of a pair of electrical devices, one or the other of which is to be energized at all times, comprising a pair of electronic tubes each of the gaseous discharge type and having at least an anode, a cathode and a grid, means providing an alternating currrent anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, and means responsive to an alternating current signal and to firing of said pilot tube controlling the firing of said pilot tube, said last mentioned means being operable with an alternating current signal of a predetermined magnitude present to cause said pilot tube to fire during alternate cycles of the anode voltage and operable with an increase in signal magnitude to cause the pilot tube to fire continuously and operable with a decrease in signal magnitude to increase the number of cycles of non-firing of said pilot tube in proportion to the extent of signal departure from the predetermined magnitude.

10. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, means placing an alternating current bias on the grid of said pilot tube preventing the same from firing in the absence of a signal, and means for imposing an alternating current signal on the grid of said pilot tube, said grid biasing means including phase shifting means operable in response to the magnitude of the signal and to flow of current in the anode circuit of said pilot tube to determine the proportion of firing to non-firing time of said pilot tube.

11. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, means placing an alternating current bias on the grid of said pilot tube preventing the same from firing in the absence of a signal, and means for imposing an alternating current signal on the grid of said pilot tube, said grid biasing means including phase shifting means operable in response to the magnitude of the signal and to firing of said pilot tube to determine the proportion of firing to non-firing time of said pilot tube, said phase shifting means in response to a signal of a predetermined magnitude being operable to arrest firing of said pilot tube during alternate cycles of said anode voltage and operable with an increase in signal magnitude to cause said pilot tube to fire continuously and operable with a decrease in signal magnitude to increase the length of each non-firing interval in proportion to the extent of signal departure from the predetermined magnitude.

12. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, a grid circuit for said pilot tube, means including phase shifting means electrically associated with said grid circuit to provide the grid bias voltage, and means for applying an alternating current signal of proper phase to said grid circuit to initiate firing of said pilot tube by retarding the phase of the resultant grid voltage, said phase shifting means including an element connected in the anode circuit of said pilot tube and operable upon firing of said pilot tube to advance the phase of said grid bias voltage.

13. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, a grid circuit for said pilot tube, means including phase shifting means electrically associated with said grid circuit to provide the grid bias voltage, and means for applying an alternating current signal of proper phase to said grid circuit to initiate firing of said pilot tube by retarding the phase of the resultant grid voltage, said phase shifting means including an element connected in the anode circuit of said pilot tube and operable upon firing of said pilot tube to advance the phase of the grid bias voltage, such advance in the phase of the grid bias voltage being operable when coupled with a signal voltage of a given magnitude to arrest firing of said pilot tube for intervals equal to the firing intervals and operable with an increase in signal magnitude to cause said pilot tube to fire continuously and with a decrease in signal magnitude to increase the length of each non-firing interval in proportion to the extent of signal departure from the given magnitude.

14. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, a grid circuit for said pilot tube, means including phase shifting means electrically associated with said grid circuit to provide the grid bias voltage, and means for applying an alternating current signal of proper phase to said grid circuit to initiate firing of said pilot tube by retarding the phase of the resultant grid voltage, said phase shifting means including an element connected in the anode circuit of said pilot tube and operable during the first cycle of firing of said pilot tube to advance the phase of the grid bias voltage a predetermined amount whereby, dependent upon the magnitude of the signal voltage, said pilot tube may be caused to fire continuously, for alternate cycles or for one cycle only of a series of cycles increasing progressively in number as the signal magnitude decreases.

15. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, a grid circuit for said pilot tube, means including phase shifting means electrically associated with said grid circuit to provide the grid bias voltage, and means for applying an alternating current signal of proper phase to said grid circuit to initiate firing of said pilot tube by retarding the phase of the resultant grid voltage, said phase shifting means including a saturable reactor having a primary winding connected in the anode circuit of said pilot tube.

16. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, a capacitance and a resistance connected in series between the anode and the cathode of one of said tubes acting as a pilot tube, a lead connecting the grid of the other tube to a point between said capacitance and resistance, whereby the other tube is so controlled as to fire when said pilot tube is not firing and to cease firing upon firing of said pilot tube, a grid circuit for said pilot tube, means including phase shifting means electrically associated with said grid circuit to provide the grid bias voltage, and means for applying an alternating current signal of proper phase to said grid circuit to initiate firing of said pilot tube by retarding the phase of the resultant grid voltage, said phase shifting means including a saturable reactor having a primary winding connected in the anode circuit of said pilot tube and operable upon firing of said pilot tube to advance the phase of the grid bias voltage.

17. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, a grid circuit for said pilot tube, means including phase shifting means electrically associated with said grid circuit to provide the grid bias voltage, means for imposing an alternating current signal on the grid having a phase relationship such as to retard the phase of the resultant grid voltage relative to the grid bias voltage varying amounts depending upon the magnitude of the signal voltage, and means electrically associated with said phase shifting means and operable in response to firing of said pilot tube to cause said pilot tube to cause said phase shifting means to advance the grid bias voltage in phase through a predetermined angle less than the maximum retardation of grid voltage obtainable by a signal of relatively large magnitude but greater than the retardation obtainable by signals of lesser magnitude and returning the grid bias voltage to its original phase relationship at a slower rate than its advance.

18. In combination with a pair of motors whose armatures are associated with a common shaft and adapted upon energization to tend to rotate the shaft in opposite directions, a circuit for controlling the direction and speed of rotation of the shaft comprising a pair of electronic tubes each of the gaseous discharge type and having at least an anode, a cathode and a grid, means providing an alternating current anode voltage and electrically associating said tubes one with each of the motors to cause energization of the respective motor upon firing of the tube associated therewith, grid voltage producing means governed solely by one of said tubes acting as a pilot tube, means connecting the grid of the other of said tubes solely to said voltage producing means, said voltage producing means operating to prevent firing of said other tube when said pilot tube is firing and permitting firing when said pilot tube is not firing, and means operable in response to an alternating current signal of varying magnitude to govern the direction and speed of rotation of the common shaft.

19. In combination with a pair of motors whose armatures are associated with a common shaft and adapted upon energization to tend to rotate the shaft in opposite directions, a circuit for controlling the direction and speed of rotation of the shaft comprising a pair of electronic tubes each of the gaseous discharge type and having at least an anode, a cathode and a grid, means providing an alternating current anode voltage and electrically associating said tubes one with each of the motors to cause energization of the respective motor upon firing of the tube associated therewith, grid voltage producing means governed solely by one of said tubes acting as a pilot tube, means connecting the grid of the other of said tubes solely to said voltage producing means, said voltage producing means operating to prevent firing of said other tube when said pilot tube is firing and permitting firing when said pilot tube is not firing, and means responsive to an alternating current signal operable when a signal of predetermined magnitude is present to hold the common shaft stationary, to determine direction of rotation of the common shaft by direction in signal magnitude departure from the predetermined magnitude and in one direction of signal departure to determine speed of rotation of the shaft in proportion to the extent of signal departure.

20. In combination with a pair of motors whose armatures are associated with a common shaft and adapted upon energization to tend to rotate the shaft in opposite directions, a circuit for controlling the direction and speed of rotation of the shaft comprising a pair of electronic tubes each of the gaseous discharge type and having at least an anode, a cathode and a grid, means providing an alternating current anode voltage and electrically associating said tubes one with each of the motors to cause energization of the respective motor upon firing of the tube associated therewith, grid voltage producing means governed solely by one of said tubes acting as a pilot tube, means connecting the grid of the other of said tubes solely to said voltage producing means, said voltage producing means operating to prevent firing of said other tube when said pilot tube is firing and permitting firing when said pilot tube is not firing, and means responsive to an alternating current signal operable when a signal of predetermined magnitude is present to hold the common shaft stationary, to determine direction of rotation of the common shaft by direction in signal magnitude departure from the predetermined magnitude and in one direction of signal departure to determine speed of rotation of the shaft in proportion to the extent of signal departure and upon signal departure in the opposite direction to cause rotation at full speed independent of the extent of signal departure.

21. In combination with a pair of motors whose armatures are associated with a common shaft and adapted upon energization to tend to rotate the shaft in opposite directions, a circuit for controlling the direction and speed of rotation of the shaft comprising a pair of electronic tubes each of the gaseous discharge type and having at least an anode, a cathode and a grid, a pair of reactors each having a first winding connected to a source of alternating current and in circuit with one of the motors and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding, thereby to govern energization of the motor with which the reactor is associated, means placing one of said tubes under the control of the other acting as a pilot tube with said one tube firing whenever said pilot tube is not firing and not firing when said pilot tube is firing, means placing an alternating current bias on the grid of said pilot tube preventing the same from firing in the absence of a signal, and means for imposing an alternating current signal on the grid of said pilot tube, said grid bias means including phase shifting means operable in response to the magnitude of the signal and to firing of said pilot tube to govern the direction and speed of rotation of the common shaft.

22. In combination with a pair of motors whose armatures are associated with a common shaft and adapted upon energization to tend to rotate the shaft in opposite directions, a circuit for controlling the direction and speed of rotation of the shaft comprising a pair of electronic tubes each of the gaseous discharge type and having at least an anode, a cathode and a grid, a pair of reactors each having a first winding connected to a source of alternating current and in circuit with one of the motors and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding, thereby to govern energization of the motor with which the reactor is associated, means placing one of said tubes under the control of the other acting as a pilot tube with said one tube firing whenever said pilot tube is not firing and not firing when said pilot tube is firing, means placing an alternating current bias on the grid of said pilot tube preventing the same from firing in the absence of a signal, and means for imposing an alternating current signal on the grid of said pilot tube, said grid biasing means including phase shifting means having as a part thereof a saturable reactor with a primary winding connected in the anode circuit of said pilot tube whereby firing of said pilot tube advances the phase of the grid bias voltage a predetermined amount and cessation of firing of the pilot tube permits return of the grid bias voltage toward its initial phase relationship.

23. In combination with a pair of motors whose armatures are associated with a common shaft and adapted upon energization to tend to rotate the shaft in opposite directions, a circuit for controlling the direction and speed of rotation of the shaft comprising a pair of electronic tubes each of the gaseous discharge type and having at least an anode, a cathode and a grid, a pair of reactors each having a first winding connected to a source of alternating current and in circuit with one of the motors and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding, thereby to govern energization of the motor with which the reactor is associated, means placing one of said tubes under the control of the other acting as a pilot tube with said one tube firing whenever said pilot tube is not firing and not firing when said pilot tube is firing, a grid circuit for said pilot tube, means including a phase shifter electrically associated with said grid circuit to place a bias voltage on said grid preventing said pilot tube from firing in the absence of a signal, alternating current signal generating means electrically associated with said grid circuit and operable to impose a signal of varying magnitude and of a phase relationship retarding the grid voltage through an angle to initiate firing of said pilot tube, said signal generating means including a first adjustable element operable to vary the magnitude of the signal by changing the balance of said signal generating means and a second adjustable element connected to be driven by the common shaft to restore the balance, and means electrically associated with said phase shifter and operable in response to firing of said pilot tube to advance the grid bias in phase a predetermined amount whereby the magnitude of the signal voltage as determined by the relative adjustment of the elements of said signal generating means determines the direction and speed of rotation of the common shaft.

24. A circuit for controlling the operation of a pair of electrical devices, one or the other of which is to be energized at all times, comprising a pair of electronic tubes each of the gaseous discharge type and having at least an anode, a cathode and a grid, each of said tubes being electrically associated with one of the pair of electrical devices to cause energization of the respective device upon firing of the tube associated therewith, an alternating current anode voltage for said tubes, means responsive to an alternating current signal controlling the firing of one of said tubes, said means in response to an alternating current signal of a certain magnitude causing the one of said tubes to fire during each positive half cycle of the anode voltage and in response to an alternating current signal of lesser magnitude to cease firing, and means solely under the control of said one of said tubes for controlling the firing of the other of said tubes.

25. A circuit for controlling the operation of a pair of electrical devices, one or the other of which is to be energized at all times, comprising a pair of electronic tubes each of the gaseous discharge type and having at least an anode, a cathode and a grid, means providing an alternating current anode voltage and electrically associating said tubes one with each of the pair of electrical devices to cause energization of the respective device upon firing of the tube associated therewith, means placing one of said tubes under the control of the other acting as a pilot tube with said one tube firing whenever said pilot tube is not firing and not firing when said pilot tube is firing, and means operable in response to an alternating current signal and to firing of said pilot tube governing operation of said pilot tube, said last named means being operable in response to an alternating current signal of a certain magnitude or greater to cause said pilot tube to fire during each positive half cycle of the anode voltage and in response to an alternating current signal of any value less than the certain magnitude to arrest firing of said pilot tube and to maintain the same non-firing so long as the signal magnitude is less than the certain magnitude.

26. In combination with a pair of motors whose armatures are associated with a common shaft and adapted upon energization to tend to rotate the shaft in opposite directions, a circuit for controlling the direction of rotation of the shaft comprising a pair of electronic tubes each of the gaseous discharge type and having at least an anode, a cathode and a grid, means providing an alternating current anode voltage and electrically associating said tubes one with each of the motors to cause energization of the respective motor upon firing of the tube associated therewith, grid voltage producing means governed solely by one of said tubes acting as a pilot tube, means connecting the grid of the other of said tubes solely to said voltage producing means, said voltage producing means operating to prevent firing of said other tube when said pilot tube is firing and permitting firing when said pilot tube is not firing, and means operable in response to the direction of departure of an alternating current signal from a predetermined magnitude to govern the direction of rotation of the common shaft.

PAUL GLASS.

REFERENCES CITED

The following references are of record in the file of this patent:

UNITED STATES PATENTS

| Number | Name | Date |
| --- | --- | --- |
| 1,937,369 | Willis | Nov. 28, 1933 |
| 1,998,938 | Mittag | Apr. 23, 1935 |
| 2,077,179 | Moseley et al. | Apr. 13, 1937 |
| 2,175,017 | Cockrell | Oct. 3, 1939 |
| 2,231,570 | Ryder | Feb. 11, 1941 |
| 2,234,349 | MacKay | Mar. 11, 1941 |
| 2,317,807 | Ryder | Apr. 27, 1943 |
| 2,329,073 | Mitchell et al. | Sept. 3, 1943 |
| 2,333,393 | Ryder | Nov. 2, 1943 |
| 2,346,838 | Haight | Apr. 18, 1944 |
| 2,348,862 | Sorkin | May 16, 1944 |
| 2,352,953 | Haight | July 4, 1944 |
| 2,399,675 | Hays, Jr. | May 7, 1946 |
| 2,399,695 | Satterlee | May 7, 1946 |
| 2,413,181 | Hergenrother | Dec. 24, 1946 |
| 2,435,966 | Isserstedt | Feb. 17, 1948 |